US007722131B2

(12) United States Patent
Daigre

(10) Patent No.: US 7,722,131 B2
(45) Date of Patent: May 25, 2010

(54) CONTROL COMPONENT FOR A SPRING APPLIED-PRESSURE RELEASED HYDRAULIC BRAKE AND HYDRAULIC MOTOR

(75) Inventor: Richard Daigre, Hopkinsville, KY (US)

(73) Assignee: White Drive Products, Inc., Hopkinsville, KY (US)

( * ) Notice: Subject to any disclaimer, the term of this patent is extended or adjusted under 35 U.S.C. 154(b) by 1149 days.

(21) Appl. No.: 11/346,513

(22) Filed: Feb. 2, 2006

(65) Prior Publication Data

US 2007/0176485 A1    Aug. 2, 2007

(51) Int. Cl.
*B60T 13/22* (2006.01)
(52) U.S. Cl. ....................................... 303/71
(58) Field of Classification Search .................. 303/48, 303/56, 71, 80; 137/106, 625.49, 870, 884
See application file for complete search history.

(56) References Cited

U.S. PATENT DOCUMENTS

| | | | | | |
|---|---|---|---|---|---|
| 2,809,652 | A | * | 10/1957 | Caslow | 137/106 |
| 3,269,416 | A | * | 8/1966 | Adams | 137/625.63 |
| 3,360,304 | A | * | 12/1967 | Adams et al. | 303/18 |
| 3,759,357 | A | | 9/1973 | Bianchetta | |
| 3,879,091 | A | * | 4/1975 | Bridwell et al. | 303/71 |
| 3,897,115 | A | * | 7/1975 | DeGeeter et al. | 303/71 |
| 3,976,333 | A | | 8/1976 | Fillion et al. | |
| 4,006,939 | A | * | 2/1977 | Schexnayder | 303/71 |

(Continued)

FOREIGN PATENT DOCUMENTS

JP    4-102762    4/1992

(Continued)

OTHER PUBLICATIONS

USPTO Office Action; U.S. Appl. No. 11/373,318, filed Mar. 10, 2007; First Named Inventor Richard Daigre; Confirmation No. 8783; Mail Date May 25, 2007; Delivery Mode paper—16 pages.

*Primary Examiner*—Christopher P Schwartz
(74) *Attorney, Agent, or Firm*—Rankin Hill & Clark LLP

(57) ABSTRACT

A control for a hydraulic circuit includes a manifold housing and a movable member disposed in the housing. The manifold housing can include a brake port and a pressure port. The brake port is in fluid communication with an associated spring applied-pressure released brake. The pressure port is in fluid communication with an associated pump. The movable member moves between a first operating position and a second operating position when pressure is not being applied to the pressure port. In the first operating position, the movable member is disposed to allow fluid communication between the associated pump and the associated brake. In the second operating position the movable member is disposed to prohibit fluid communication in a first direction from the associated brake toward upstream the associated pump while allowing fluid communication from upstream the associated pump toward the associated brake in a second direction. The manifold housing can also include first and second motor ports. In this embodiment, each motor port is in fluid communication with an associated motor. In the first operating position, the movable member is disposed to prohibit fluid communication between the first motor port and the second motor port. In the second operating position the movable member is disposed to allow fluid communication between the first motor port and the second motor port.

19 Claims, 5 Drawing Sheets

U.S. PATENT DOCUMENTS

| | | | |
|---|---|---|---|
| 4,019,321 A | 4/1977 | Aoyama et al. | |
| 4,119,355 A * | 10/1978 | Kreitner | 303/85 |
| 4,163,584 A * | 8/1979 | Koenig | 303/7 |
| 4,169,633 A | 10/1979 | Stearns | |
| 4,195,716 A | 4/1980 | Wirt | |
| 4,254,845 A | 3/1981 | Braun | |
| 4,307,917 A | 12/1981 | Hasselbacher et al. | |
| 4,317,331 A | 3/1982 | Aruga et al. | |
| 4,324,098 A | 4/1982 | Aruga et al. | |
| 4,451,095 A * | 5/1984 | Chichester et al. | 303/71 |
| 4,481,769 A | 11/1984 | Nagahara | |
| 4,495,767 A | 1/1985 | Akiyama et al. | |
| 4,729,222 A | 3/1988 | Tanaka et al. | |
| 4,813,518 A | 3/1989 | Akiyama et al. | |
| 4,858,435 A | 8/1989 | Ikeda | |
| 5,895,099 A | 4/1999 | Diecke et al. | |
| 5,984,425 A * | 11/1999 | Orzal | 303/3 |
| 6,050,091 A | 4/2000 | Maruta | |
| 6,675,576 B2 | 1/2004 | Bigo et al. | |
| 6,688,419 B2 * | 2/2004 | Eriksen et al. | 180/308 |
| 6,698,196 B2 | 3/2004 | Hashimoto et al. | |
| 6,988,580 B2 | 1/2006 | Ohashi et al. | |
| 2005/0236214 A1 | 10/2005 | Ohashi et al. | |

FOREIGN PATENT DOCUMENTS

WO  WO 2004/041610  5/2004

* cited by examiner

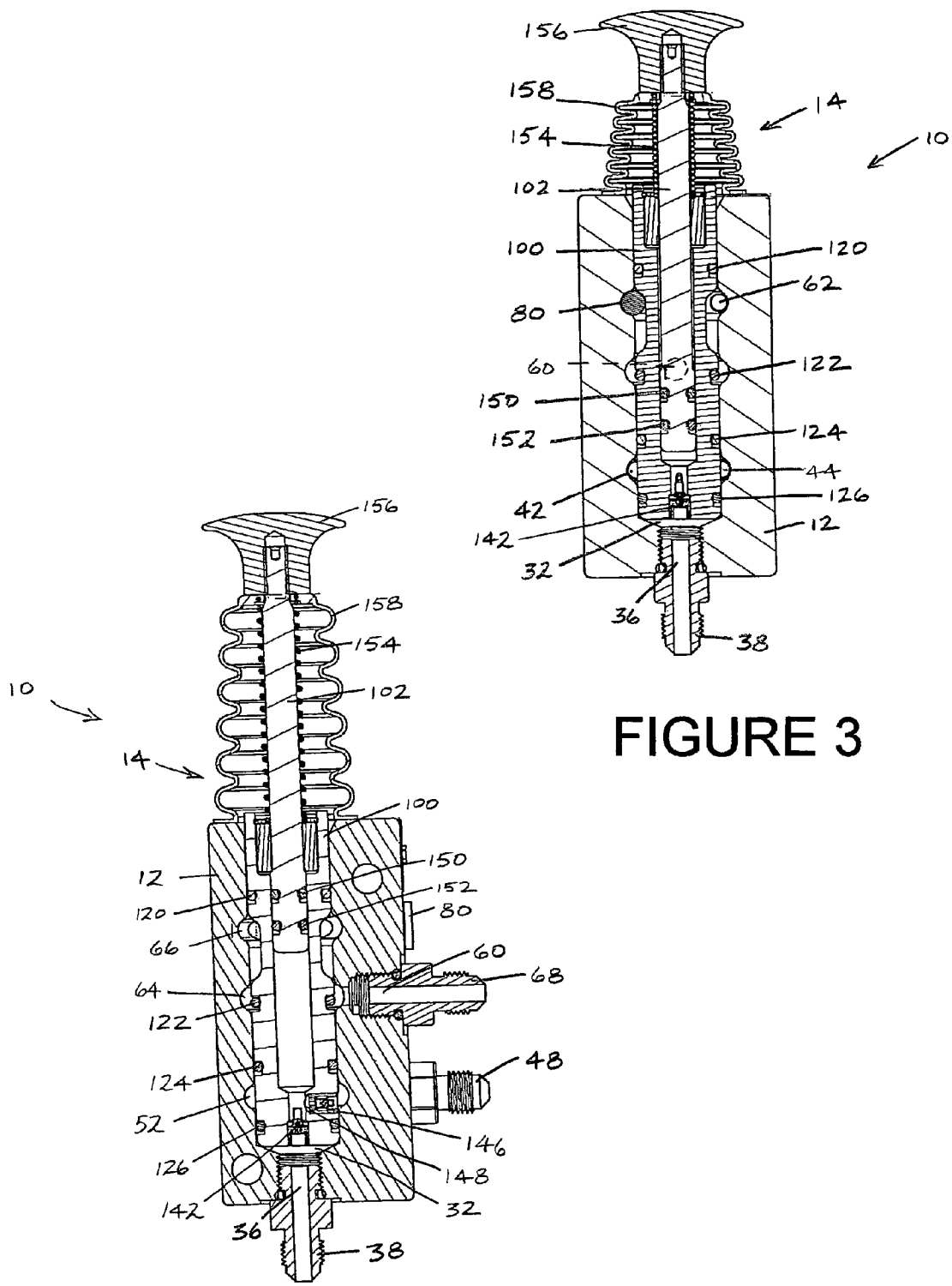

CONTROL COMPONENT FOR A SPRING APPLIED-PRESSURE RELEASED HYDRAULIC BRAKE AND HYDRAULIC MOTOR

BACKGROUND OF THE INVENTION

When a hydraulic system failure occurs or when the engine of the prime mover is not running to drive the pump for a brake system having spring applied-pressure released brakes, the brakes are spring applied by the loss of hydraulic pressure. When such a loss of pressure occurs, a vehicle of this type cannot be towed to a suitable repair station until the brakes are again pressurized, thus releasing the brakes.

Manual pumps are used to pressurize and release the brakes. These known manual pumps typically include at least three ports: a pressure port, a brake port, and a tank port. In these known manual pumps, when one is manually pumping to pressurize the brakes, the pressure port is typically blocked and hydraulic fluid is drawn from the tank to pressurize the brake. One known manual pump includes more than one rod, i.e. a first rod to act as a piston for the manual pump and a second rod to block flow from the pressure port to the brake port. Another known manual pump includes valves in combination with rods. The valves require the operator to turn or adjust the valves to block flow from the pressure port to the brake port. Both of these known manual pumps require a complex manifold structure to provide the proper fluid communication between the ports in different operating modes and also require operator training to know which rods to push or which valves to turn.

Many vehicles that employ spring applied-pressure released brakes also employ hydraulic motors to drive the vehicle. When the engine is not running to drive the pump for the hydraulic motors, typically a shut-off valve is disposed in the hydraulic circuit to block the flow of hydraulic fluid through the hydraulic motors thus prohibiting rotation of the hydraulic motor and thus the vehicle. These hydraulic motors can also be used to perform dynamic braking to stop the vehicle. Dynamic braking is also performed by blocking flow through the motors so that the motors cannot rotate. Release valves or counter-balance valves can be disposed in the circuit to dump the flow of hydraulic fluid during dynamic braking so that the hydraulic motors do not come to an abrupt halt.

As stated above, when the engine is not running or a hydraulic system failure has occurred, a shut-off valve disposed in the hydraulic circuit actuates to stop the flow of hydraulic fluid and, therefore, block rotation of the hydraulic motors. When the vehicle that includes these hydraulic motors needs to be moved, the shut-off valve can be short circuited to allow for the movement of fluid through the hydraulic motors. Typically, a needle valve is located in the hydraulic circuit remote from the aforementioned manual pump used to pressurize the brakes. Accordingly, to move a vehicle that includes spring applied-pressure released brakes and hydraulic motors that are blocked upon loss of pressure, one must pressurize the brakes using a manual pump and move to another location on the vehicle to open a needle valve to short circuit the shut-off valve that blocks flow through the motors.

SUMMARY OF THE INVENTION

In one embodiment, a control for a hydraulic circuit includes a manifold housing and a movable member disposed in the housing. The manifold housing can include a brake port and a pressure port. The brake port is in fluid communication with an associated spring applied-pressure released brake. The pressure port is in fluid communication with an associated pump. The movable member moves between a first operating position and a second operating position when pressure is not being applied to the pressure port. In the first operating position, the movable member is disposed to allow fluid communication between the associated pump and the associated brake. In the second operating position the movable member is disposed to prohibit fluid communication in a first direction from the associated brake toward upstream the associated pump while allowing fluid communication from upstream the associated pump toward the associated brake in a second direction.

The manifold housing can also include first and second motor ports. In this embodiment, each motor port is in fluid communication with an associated motor. In the first operating position, the movable member is disposed to prohibit fluid communication between the first motor port and the second motor port. In the second operating position the movable member is disposed to allow fluid communication between the first motor port and the second motor port.

Another embodiment includes a hydraulic circuit that includes a spring applied-pressure released brake, a pressure source, and a control that is in fluid communication with the brake and the pressure source. The control is operative in a first position and a second position. In the first position the control allows fluid communication between the pressure source and the brake to apply pressure to the brake. In the second position the control prohibits fluid communication in a first direction between downstream from the pressure source and the brake while allowing fluid communication in a second direction between downstream from the pressure source and the brake.

The hydraulic circuit can further include a hydraulic motor in fluid communication with the control. In the first operating position, the control prohibits fluid communication between upstream the motor and downstream the motor through the control. In the second operating position the control allows fluid communication between upstream the motor and downstream the motor through the control.

A control for a hydraulic circuit includes a manifold housing having a bore, a pressure port in fluid communication with the bore, a brake port in fluid communication with the bore, a first motor port in fluid communication with the bore, a second motor port in fluid communication with the bore, and a push rod assembly at least partially received in the bore. The push rod assembly is movable between a first position and a second position. When in the first position, the push rod assembly can prohibit fluid communication between the first motor port and the second motor port. In the second position the push rod assembly can allow fluid communication between the first motor port and the second motor port. In the first position, the push rod assembly can also allow fluid communication between the pressure port and the brake port. In the second position the push rod can also allow fluid communication between the pressure port and the brake port in a first direction while prohibiting fluid communication between the pressure port and the brake port in a second direction.

BRIEF DESCRIPTION OF THE FIGURES

FIG. 3 is a cross-sectional view of the control of FIG. 1 shown in a second operating position.

FIG. 4 is a cross-sectional view taken 90° from the cross-sectional view shown in FIGS. 2 and 3 where the control is shown in the second operating position and an inner rod of the control is extended to depict a pumping action.

DETAILED DESCRIPTION

Figure 1:
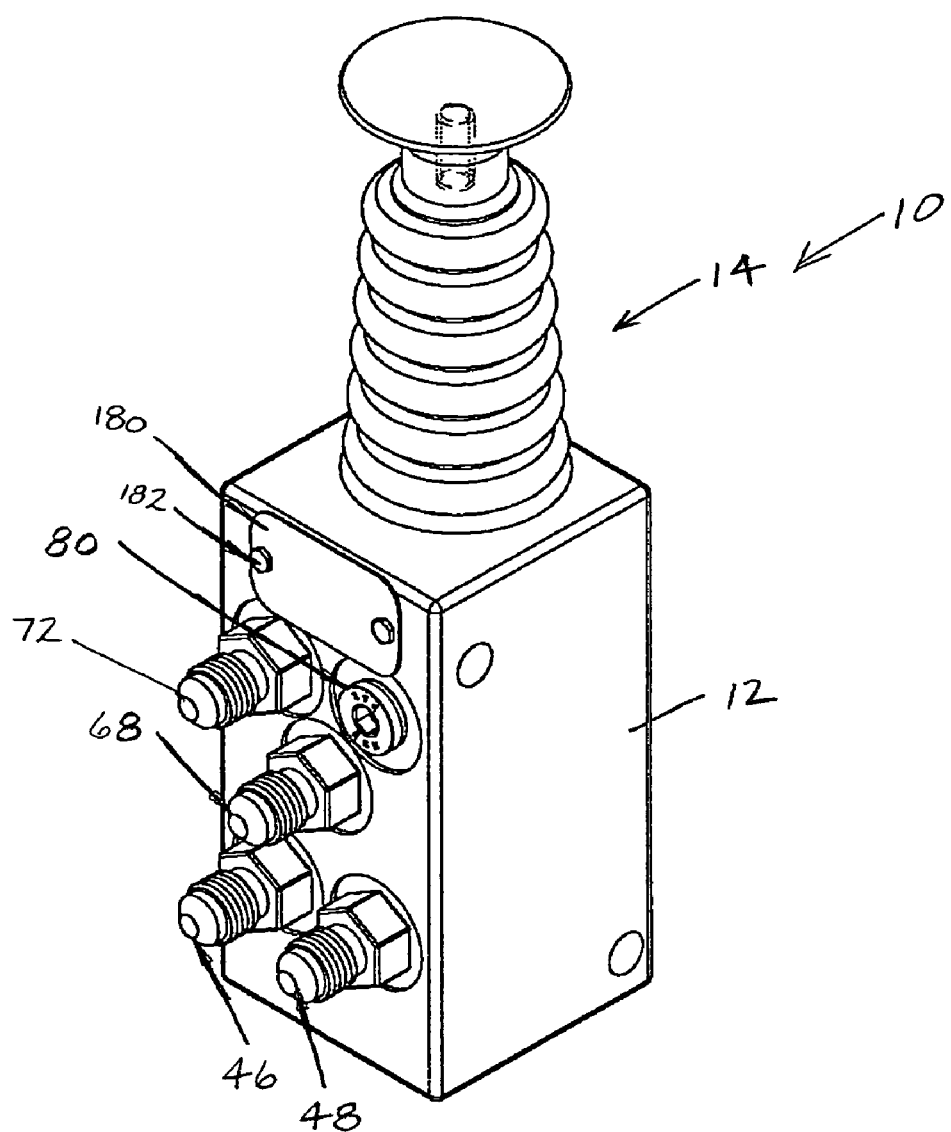
FIG. 1 is a perspective view of a control for a hydraulic circuit.

With reference to FIG. 1, a control 10 for a hydraulic circuit, which will be described in more detail below, generally includes a manifold housing 12 and a movable member 14, which will also be referred to as a pump rod subassembly. The control 10 can be used to manually pressurize spring applied-pressure released brakes and to short circuit a shut-off valve so that hydraulic motors can be rotated. The control 10 can be used to perform only one of the aforementioned operations, if desired.

Figure 2:
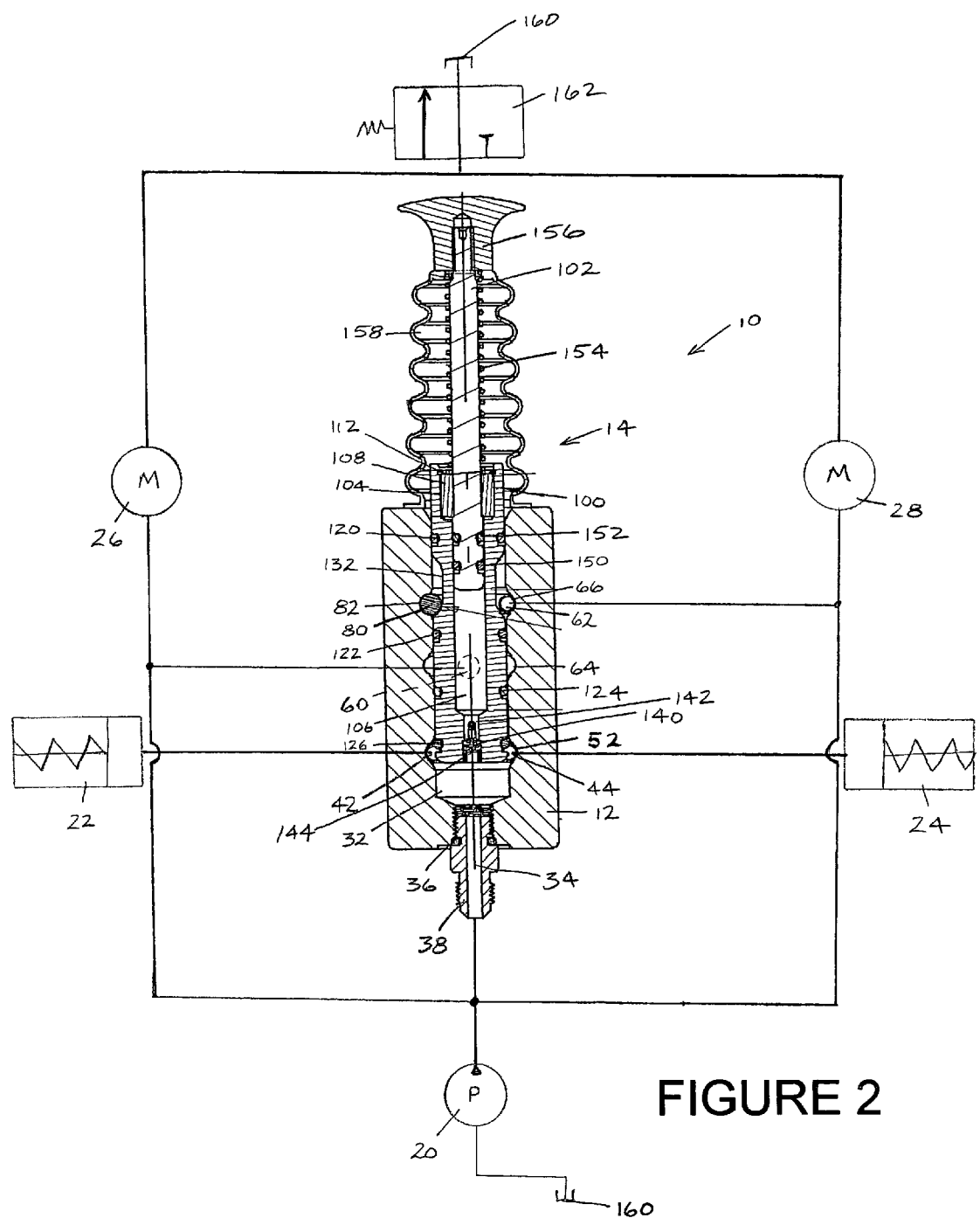
FIG. 2 is a cross-sectional elevation view of the control of FIG. 1 as a part of an example of a hydraulic circuit for a prime mover with which the control can be used. The control is shown in a first operating position.

The control 10 is movable between a first mode of operation (depicted in FIG. 2) and a second mode of operation (depicted in FIGS. 3 and 4). The first mode, or position, allows for fluid communication between a pressure source, e.g. a pump 20, and spring applied-pressure released brakes 22 and 24. While in the first mode of operation, hydraulic motors 26 and 28 are isolated from one another in the control 10. The hydraulic circuit depicted in FIG. 2 simply provides a simplified environment in which the control 10 can be used. Accordingly, the hydraulic motors 26 and 28 need not be connected in parallel as is shown in FIG. 2. Instead, the motors can be connected in series, or only one motor or many motors can be provided. Also, the control can be used to control only one brake, even though two are shown. Two motors and two brakes are shown, since such a configuration is common in prime movers such as scissor lifts, and the like. Nevertheless, the control 10 should not be limited to only these environments.

With continued reference to FIG. 2, the manifold housing 12 includes a central bore, or cavity, 32 that receives a portion of the pump rod subassembly 14. In the depicted embodiment, the central bore 32 is substantially cylindrical and axially symmetric about a longitudinal axis 34 of the manifold housing 12. The central bore 32 does not extend entirely through the manifold housing 12, but instead ceases near a lower portion of the housing (as depicted in FIG. 2).

The manifold housing 12 also includes a plurality of ports and passages that are in communication with the central cavity 32. The ports and passages will be described as having certain configurations. The invention is not limited to only the configurations that are described below and depicted in the figures. To the contrary, the invention is defined by the appended claims.

Figure 5:
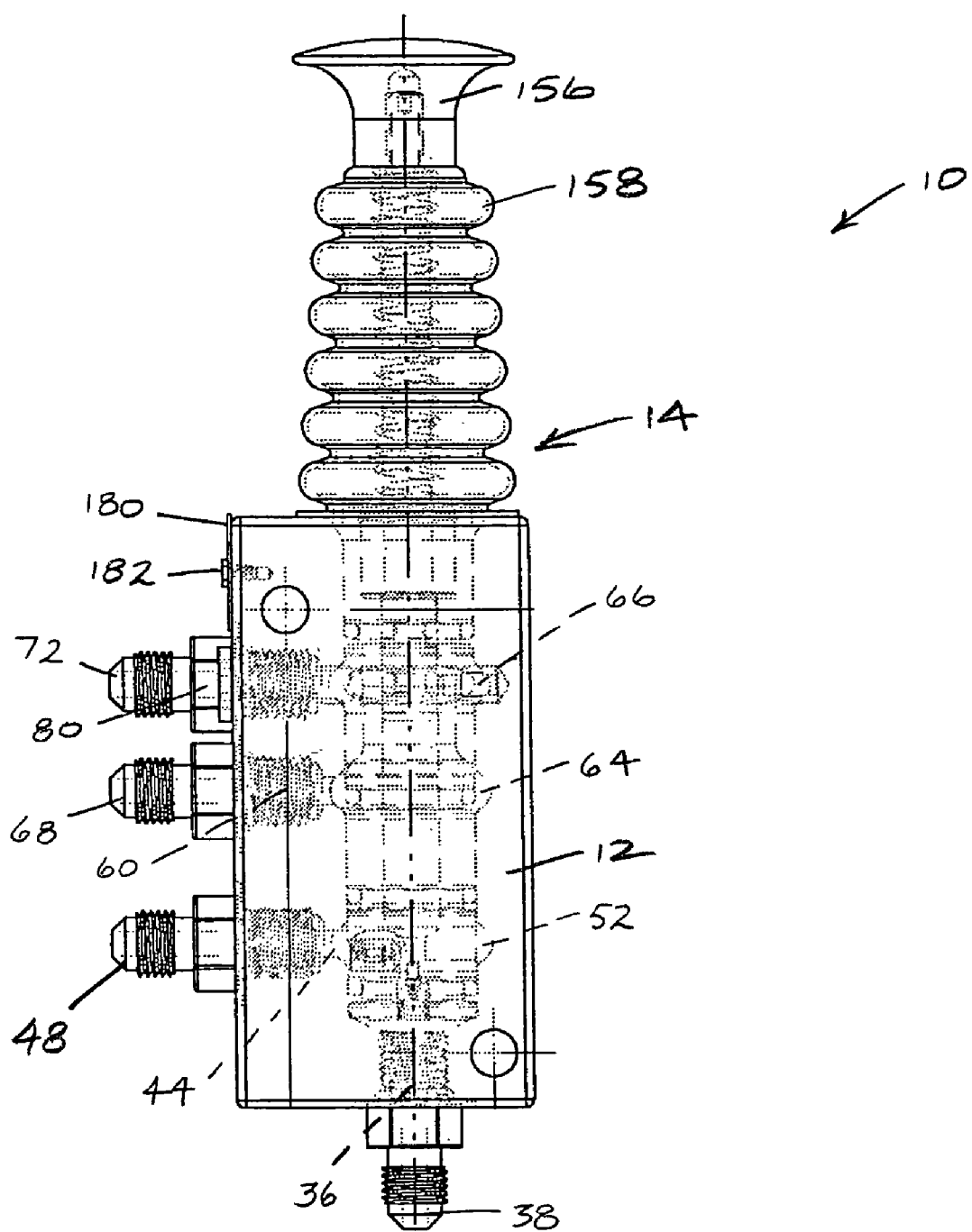
FIG. 5 is side view of the control of FIG. 1, with internal passages shown in phantom.

A pressure port 36 communicates with a lower portion of the cavity 32. A pressure port fitting 38 is received inside the pressure port 36 to allow for a hose to connect the pump 20 to the pressure port 36. A first brake port 42 and a second brake port 44 also communicate with the cavity 32. As more clearly seen in FIG. 1, first and second brake port fittings 46 and 48 can be received in the respective brake ports. The brake port fittings allow for hydraulic hoses, or other device for carrying hydraulic fluid, to connect the brakes 22 and 24 to the control 10. As most clearly seen in FIG. 5, an annular groove 52, which will be referred to as the lower annular groove, is machined out of the manifold housing 12, or formed in another manner, to allow for fluid communication between the brake ports 42 and 44 and the cavity 32.

With reference back to FIG. 2, the control 10 also includes a first motor port 60 that is in fluid communication with the bore 32 and a second motor port 62 that is also in communication with the bore 32. In the depicted embodiment, the first motor port 60 is spaced from the second motor port 62 along the central axis 34. A second annular groove 64, which will be referred to as the intermediate annular groove, is machined in the manifold housing 12 to allow for fluid communication between the first motor port 60 and the internal bore 32. Similarly, a third annular groove 66, which will be referred to as the upper annular groove, is also machined into the manifold housing 12 to provide fluid communication between the second motor port 62 and the internal bore 32. The upper annular groove 66 is spaced from the intermediate annular groove 64 along the central axis 36 of the manifold housing 12. As more clearly seen in FIG. 1, a first motor port fitting 68 allows for a fluid hose, or other device, to connect to the first motor port 60 (FIG. 2). Similarly, a second motor port fitting 72 allows for the connection of a hydraulic hose, or similar fluid carrying device, to the manifold housing 12 to allow for fluid communication with the second motor port 62 (FIG. 2).

The invention is not limited to the exact locations of the ports and fittings as shown in the figures. To the contrary, the location of the ports and fittings can be elsewhere.

A pin 80 is received in a transverse, e.g. radial, bore 82 of the manifold housing 12. The transverse bore 82 intersects the upper annular groove 66. The pin 80 limits the linear movement of the pump rod assembly 14 in the manifold housing 12 in a manner that will be described in more detail below.

With continued reference to FIG. 2, the pump rod assembly 14 includes an outer rod, or spindle, 100 and an inner rod 102 that is received inside the outer rod. The push rod assembly 14 is moveable between a first operating position, as shown in FIG. 2, and a second operating position as shown in FIGS. 3 and 4.

The outer rod 100 includes a first, i.e. upper, counterbore 104 and a second, i.e. lower, coaxial counterbore 106 that has a smaller diameter and extends further into the outer rod 100 as compared to the first counterbore 104. The upper counterbore 104 receives a bushing 108. The bushing 108 receives the inner rod 102 and protects the inner rod from wear. A snap ring 112 contains the bushing 108 inside the upper counterbore 104. The lower counterbore 106 receives the inner rod 102 to define a pump chamber, which will be described in more detail below. The dimensions of the inner rod 102 and the lower counterbore 106 can change, for example, where it is desirable to provide a larger pump chamber.

The outer rod 100 also includes a plurality of annular grooves. Each groove is configured to receive a seal. The seals are spaced from one another along the axis 34. The seals isolate the annular grooves that are formed in the manifold housing 12, i.e. lower annular groove 52, intermediate annular groove 64 and upper annular groove 66, from one another. In the depicted embodiment, there are four seals: a first (upper) seal 120, a second (upper intermediate) seal 122, a third (lower intermediate) seal 124, and a fourth (lower) seal 126. Each seal contacts an inner surface of the internal bore 32 of the manifold housing 12.

The outer rod 100 also includes an elongated annular notch 132 machined into the outer rod. The elongated notch 132 cooperates with the pin 80 to limit upward movement of the outer rod 100 when pressure is applied to the pressure port 36. The pin 80 also limits downward movement of the outer rod 100. In the depicted embodiment, the pin 80 limits downward movement of the outer rod 100, as opposed to the bottom of the cavity 32 limiting the downward movement. In the depicted embodiment, the elongated notch 132 has a dimension that is parallel with the axis 34, i.e. axial dimension, that is about equal to the distance between the lower planar surface of the outer rod 100 and the bottom of the central bore 32 of the manifold housing 12, although such a configuration is not required.

A first valve 140, which in the depicted embodiment is a one-way check valve, is inserted into an axial passage 142 of the outer rod 100. A filter 144 can also be disposed adjacent the one-way check valve 140. The passage 142 communicates with the lower counterbore, i.e. pump chamber, 106 of the outer rod 100. With reference to FIG. 4, a second one-way check valve 146 is disposed in a radial passage 148 in the outer rod 100. The passage 148 communicates with the pump chamber 106. The flow of hydraulic fluid through these check valves will be described in more detail below.

As explained above, the inner rod 102 is received in the second bore 106 of the outer rod 100. The inner rod 102 includes annular grooves that are spaced from one another along the central axis 34. A lower annular groove receives a first (lower) seal 150 and an upper groove receives a second (upper) seal 152. Two seals are provided to encourage the generation of a vacuum during manual pumping, which will be described in more detail below.

A biasing member, e.g. a spring, 154 biases the inner rod 102 out of the second counterbore 106 of the outer rod 100. The biasing member contacts the bushing 108 and a handle 156 disposed at an end of the inner rod 102 opposite the seals 150 and 152. A bellows 158 surrounds the inner rod 100 and the spring 154 between the handle 156 and the manifold housing 12.

Figure 6:
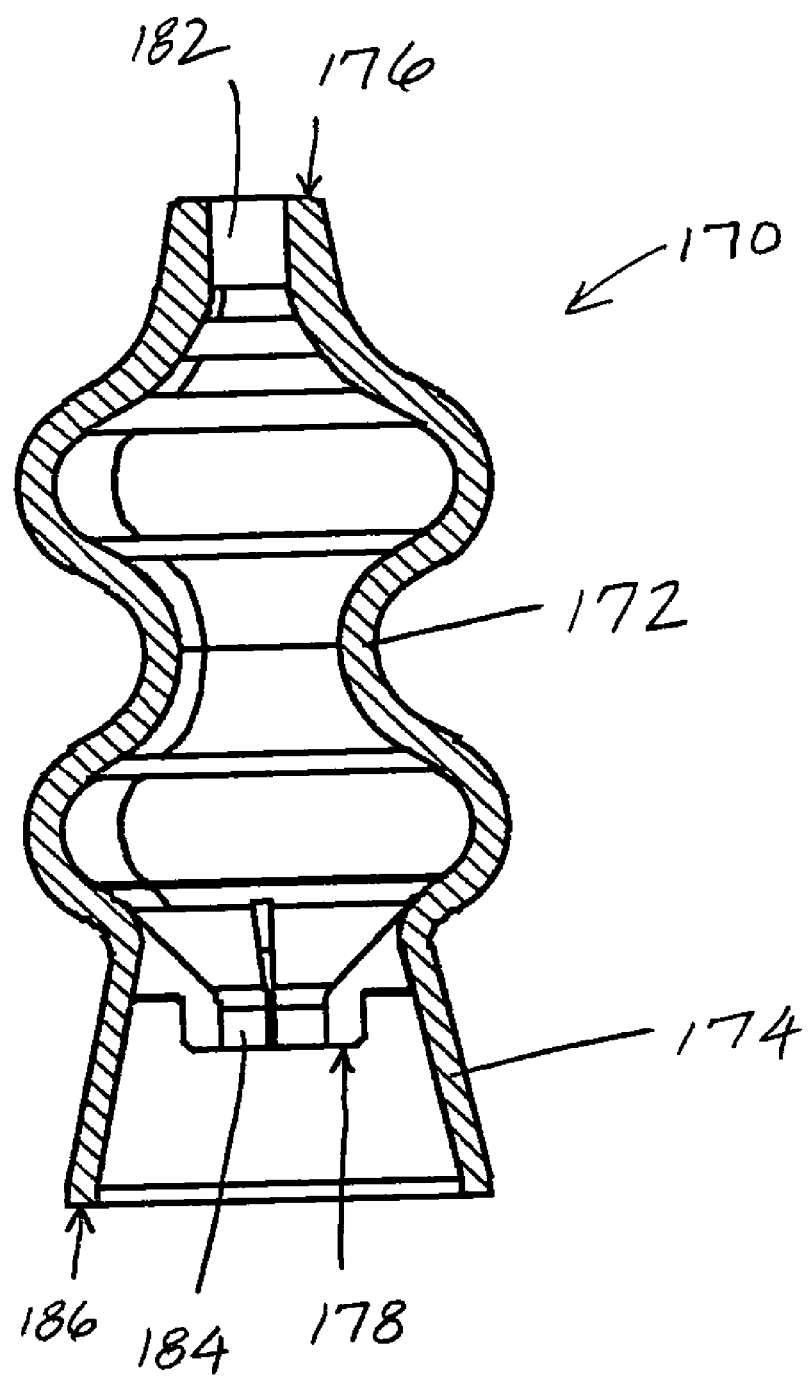
FIG. 6 is a cross-sectional view of a bellows spring for use with a control similar to the control of FIG. 1.

With reference to FIG. 6, an alternative biasing member, e.g. a bellows spring, 170 can bias the inner rod 102 (FIG. 2) out of the second counterbore 106 (FIG. 2) of the outer rod 100 (FIG. 2). Use of the bellows spring 170 can obviate the spring 154; however, the bellows springs can be used in addition to the spring. The bellows spring as depicted in FIG. 6 includes a main body 172, which acts as the biasing portion of the bellows spring, and a skirt 174 that depends from the main body. The bellows spring is constructed of a thick rubber-like material when constructed and placed on the control, the bellows spring has a spring constant that is similar to that of the spring 154 disclosed in FIG. 2. The bellows spring includes an upper contact surface 176 that contacts the handle 156 (FIG. 2) that attaches to the outer rod 102 (FIG. 2). The bellows spring 170 also includes a lower contact surface 178 that contacts the manifold housing 12 (FIG. 2). The biasing action of the bellows spring 170 is performed in the main body between the upper contact surface 176 and the lower contact surface 178.

The bellows spring 170 also includes an upper opening 182 that is dimensioned to receive the inner rod 102 and a lower opening 184, adjacent the lower contact surface 178, that is also dimensioned to receive the inner rod 102. The lower opening 184 is slightly larger so that the inner rod 102 can move freely in the lower opening. The skirt 174 will typically have a thinner cross section as compared to the main body 172 so that the skirt easily moves when the inner rod 102 is depressed into the manifold housing 12. The spring bellows 170 also includes a lower skirt surface 186 that rests on the manifold 12 (FIG. 2). The skirt 174 acts to isolate the inner rod 102 from the elements to keep debris out of the control 10.

As explained above, the control 10 operates between a first operating position (FIG. 2) and a second operating position (FIG. 3). In the first operating position the pressure source 20 communicates with the brakes 22 and 24 via the pressure port 36 and the brake ports 42 and 44. As more clearly seen in FIG. 2, the lower seal 126 resides in the lower annular groove 52. Alternatively, the lower seal 126 can contact the outer rod 100 above the lower annular groove 52 and the manifold housing 12 to isolate the hydraulic fluid from the remainder of the ports. Also while in the first operating position, the first motor port 60 is isolated from the second motor port 66 by the upper intermediate seal 122. Furthermore, the lower intermediate seal 124 further isolates the first motor port 60 from the brake ports 42 and 44. Accordingly, pressure is delivered from the pump 20 through the motors 26 and 28 and dumped into a reservoir 160, if desired. Alternative configurations can be provided. A normally open shut-off valve 162 allows for fluid communication between the motors 26 and 28 and the tank 160.

When pressure is not being applied to the brakes 22 and 24 via the pump 20 the springs in the brake actuate. With reference to FIG. 3, when pressure is not being supplied to the pressure port 36, the push rod assembly 14 can be moved into the second operating position that is shown in FIG. 3. In this operating position, the brake ports 42 and 44 are isolated from the pressure port 36 by the lower seal 126 being disposed below the lower annular groove 52. The first one-way check valve 140 allows for fluid to be drawn upstream from the pump 20 into the second bore 106 of the outer rod 100 upon upward movement (as per the orientation shown in FIG. 4) of the inner rod 102. With reference to FIG. 4, downward movement of the inner rod 102 results in fluid passing through the second one-way check valve 146 into the lower annular groove 52 and thus into the brake ports 42 and 44. Accordingly, by pumping the inner rod 102 while the outer rod 100 is in the second operating position, pressure can be applied to the brakes 22 and 24 thus releasing the springs. In other words, fluid is allowed to travel from upstream of the pump 20 (FIG. 2) and through the first check valve 142; however, the first check valve prohibits flow from the pump chamber 106 towards the pump 20. Also, fluid is allowed to travel from the pump chamber 106 towards the brakes 22 and 24 through the second check valve 146; however, the second check valve prohibits fluid from traveling from the brakes 22 and 24 toward the pump chamber 106. In the depicted embodiment, while the control 10 is in the first position fluid can enter the pump chamber 106 through the first valve 144 and leak into the lower annular groove 52 through the second valve 146 (FIG. 4).

While no pressure is being applied by the pump 20, the motors 26 and 28 in the depicted configuration will not turn while the control 10 is in the first operating position (FIG. 2). This is because the valve 162 will shut off and the motors 26 and 28 can no longer communicate with the tank 160. Accordingly, fluid does not travel through the motors and the motor do not rotate. With reference to FIG. 3, when the outer rod 100 is pushed into the second operating position, the upper intermediate seal 122 moves below and/or into the intermediate annular groove 64 so that the first motor port 60 can communicate with the second motor port 62. Thus, while in the second operating position, the valve 162 (FIG. 2) is short circuited and the motors 26 and 28 can communicate with one another via the control 10 so that they can rotate. As seen in FIG. 4, the upper seal 120 is maintained above the second motor port 66 so that communication is allowed between the first motor port 60 and the second motor 66 while fluid does not escape internal bore 32 of the manifold housing 12.

The control 10 is automatically reset upon pressurization of the pressure port 36. Pressurization of the pressure port 36 results in the outer rod 100 moving upward so that the pump 20 can communicate with the brakes 22 and 24 via the brake ports 42 and 44. The pin 80 cooperates with a lower portion of the annular notch 132 formed in the outer rod 100 to limit further movement of the outer rod so that it does not travel out of the manifold housing 12 upon pressurization by the pump 20.

As seen in FIG. 1, the control unit 12 can be a stand alone unit that allows for the connection of pressure hoses. Nevertheless, the pump rod assembly 14 can be dropped into an existing manifold (some ports and passages in the manifold may need to be machined) such that the pump rod assembly 14 acts as a sort of cartridge valve. In other words, the housing for the control is not limited to the housing as shown in FIG. 1. Instead, the housing can be an existing manifold.

The control allows the operator of a prime mover to manually pressurize spring actuated-pressure released brakes by moving a single movable member. Accordingly, the control can be housed in a compact housing as compared to known manual pumps that are used to manually pressurize brakes. Furthermore, this single shaft control unit can draw fluid downstream from the pump, as opposed to from the tank, to pressurize the brakes thus simplifying the construction as compared to known pumping devices. Adequate fluid is located in the circuit between the pump and the control to pressurize the brakes. Additionally, downward movement of the shaft also allows the hydraulic motors to rotate freely; therefore, the operator of the prime mover need not turn an additional needle valve to allow for free rotation of the hydraulic motors.

With reference back to FIG. 1, a name plate 180 attaches to the manifold housing 12 using fasteners 182. The name plate can carry indicia regarding the source of the control, as well as other information.

Various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Even though one embodiment of the invention is disclosed above, the invention is not to be limited to only the embodiment disclosed. Instead, the invention is defined by the appended claims and the equivalents thereof.

The invention claimed is:

1. A control for a hydraulic circuit comprising:
a manifold housing in fluid communication with an associated spring applied-pressure released brake and an associated pump; and
a movable member disposed in the housing and movable between a first operating position and a second operating position when pressure is not being applied from the associated pump to the housing, in the first operating position the movable member being disposed to allow fluid communication between the associated pump and the associated brake, in the second operating position the movable member being disposed to prohibit fluid communication through the control from upstream the associated brake toward the associated pump while allowing fluid communication through the control from upstream the associated pump toward the associated brake in a second direction, wherein the movable member comprises a first member and a second member, the first member having a cavity that receives the second member and the second member being movable in relation to the first member when pressure is not being applied to the housing from the associated pump.

2. The control of claim 1, wherein the housing includes a pressure port that communicates with the associated pump and a brake port that communicates with the associated brake.

3. The control of claim 2, further comprising a one-way check valve disposed between the pressure port and a pump chamber and a second one-way check valve disposed between the pump chamber and the brake port.

4. The control of claim 1, further comprising first and second motor ports on the housing, each motor port being in fluid communication with an associated motor.

5. The control of claim 4, wherein in the first operating position the movable member being disposed to prohibit fluid communication between the first motor port and the second motor port, in the second operating position the movable member being disposed to allow fluid communication between the first motor port and the second motor port.

6. A hydraulic circuit comprising:
a spring applied-pressure released brake;
a pressure source;
a control in fluid communication with the brake and the pressure source, the control operative in a first position allowing fluid communication between the pressure source and the brake to apply pressure to the brake, and in a second position; and
first and second valves, the first valve interposed between the pressure source and a first chamber in the control and the second valve interposed between the first chamber and the brake,
wherein the control component includes a rod movable in the first chamber, wherein the rod is movable between an extended position and a retracted position while the control remains in the second operating position, wherein fluid is drawn from downstream the pressure source and through the first valve as the rod is moved from the retracted position towards the extended position and fluid is moved from the first chamber and towards the brake through the second valve as the rod is moved from the extended position towards the retracted position.

7. The circuit of claim 6, further comprising a hydraulic motor in fluid communication with the control, in the first operating position the control prohibits fluid communication between upstream the motor and downstream the motor through the control.

8. The hydraulic circuit of claim 6, further comprising a hydraulic motor in fluid communication with the control, in the second operating position the control allows fluid communication between upstream the motor and downstream the motor through the control.

9. The hydraulic circuit of claim 6, wherein the control is configured to automatically reset from the second position to the first position when pressure is applied by the pressure source.

10. A control for a hydraulic circuit comprising:
a manifold housing having a bore;
a first port in fluid communication with the bore;
a second port in fluid communication with the bore;
a third port in fluid communication with the bore;
a fourth port in fluid communication with the bore; and
a push rod assembly at least partially received in the bore and including a first rod and a second rod, the first rod being received in the bore and including an internal cavity, the second rod being received in the internal cavity and movable within the internal cavity between an extended position and a retracted position, wherein the first rod is movable between a first position and a second position, when in the first position the first rod prohibiting fluid communication between the third port and the fourth port, and when in the second position the first rod being positioned to allow fluid communication between the third port and the fourth port.

11. The control of claim 10, wherein when in the first position the first rod being positioned to allow fluid communication between the first port and the second port.

12. The control of claim 11, wherein when in the second position the first rod being positioned to allow fluid communication between the first port and the second port in a first direction while prohibiting fluid communication between first port and the second port in a second direction.

13. The control of claim 10, wherein the internal cavity defines a pump chamber that is in communication with the first port and the second port.

14. The control of claim 10, further comprising a biasing member for biasing the second rod toward the extended position.

15. The control of claim 10, further comprising a pin that engages the manifold housing and the pump rod assembly first rod for limiting movement of the first rod with respect to the manifold housing.

16. A control for a hydraulic circuit comprising:
a manifold housing including a bore in fluid communication with an associated spring applied-pressure released brake and an associated pump; and
a first rod disposed in the bore and movable between a first operating position and a second operating position when pressure is not being applied from the associated pump to the bore, in the first operating position the first rod being disposed to allow fluid communication between the associated pump and the associated brake, in the second operating position the first rod being disposed to prohibit fluid communication through the control from upstream the associated brake toward the associated pump in a first direction while allowing fluid communication through the control from upstream the associated pump toward the associated brake in a second direction, wherein the first rod includes a cavity; and
a second rod received in the cavity and being moveable in relation to the first rod.

17. The control of claim 16, further comprising first and second valves, the first valve interposed between the pressure source and the cavity and the second valve interposed between the cavity and the brake.

18. The control of claim 17, wherein the second rod is movable between an extended position and a retracted position while the first rod remains in the second operating position, wherein fluid is drawn from downstream the pressure source and through the first valve as the second rod is moved from the retracted position towards the extended position and fluid is moved from the cavity and towards the brake through the second valve as the second rod is moved from the extended position towards the retracted position.

19. The control of claim 16, wherein the first rod moves from the second operating position to the first operating position when pressure is applied to the bore by the associated pump.

* * * * *

UNITED STATES PATENT AND TRADEMARK OFFICE
CERTIFICATE OF CORRECTION

PATENT NO. : 7,722,131 B2
APPLICATION NO. : 11/346513
DATED : May 25, 2010
INVENTOR(S) : Richard Daigre It is certified that error appears in the above-identified patent and that said Letters Patent is hereby corrected as shown below:

Col. 9, Line 22, Claim 15, the words "push rod assembly" should be deleted.

Signed and Sealed this

Twelfth Day of October, 2010

David J. Kappos
*Director of the United States Patent and Trademark Office*